United States Patent [19]
Parsons et al.

[11] Patent Number: 5,133,048
[45] Date of Patent: Jul. 21, 1992

[54] SYSTEM FOR PRINTING ORDERED STOCK

[75] Inventors: Carol P. Parsons, Rochester; Kris D. Kirchner, Ontario; George W. Webster, Rochester; Glen A. Dumas, Henrietta; Timothy J. Kelley, Farmington; Michael E. Farrell, Fairport, all of N.Y.

[73] Assignee: Xerox Corporation, Stamford, Conn.

[21] Appl. No.: 590,627

[22] Filed: Sep. 28, 1990

[51] Int. Cl.⁵ .................................. G06K 15/00
[52] U.S. Cl. ............................ 395/111; 395/101; 395/114
[58] Field of Search ................ 364/518–520, 364/930 MS, 235 MS; 346/134, 136; 271/293, 294, 222, 224; 355/308, 309, 311, 321, 322, 323; 395/101, 111, 114

[56] References Cited

U.S. PATENT DOCUMENTS

| | | | |
|---|---|---|---|
| 3,886,328 | 5/1975 | Kamiyama | 355/308 |
| 4,521,102 | 6/1985 | Motomura et al. | 355/308 |
| 4,568,172 | 2/1986 | Acquaviva | 271/3.1 |
| 4,607,572 | 8/1986 | Pou et al. | 355/308 |
| 4,774,544 | 9/1988 | Tsuchiya | 355/308 |
| 5,044,625 | 9/1991 | Reid | 271/52 |

Primary Examiner—Arthur G. Evans
Attorney, Agent, or Firm—Frederick E. McMuller

[57] ABSTRACT

A high speed electronic printing system for processing ordered stock such as tabbed sheets is determined for use in maintaining the prints produced in correct sequence with the tabbed stock.

8 Claims, 19 Drawing Sheets

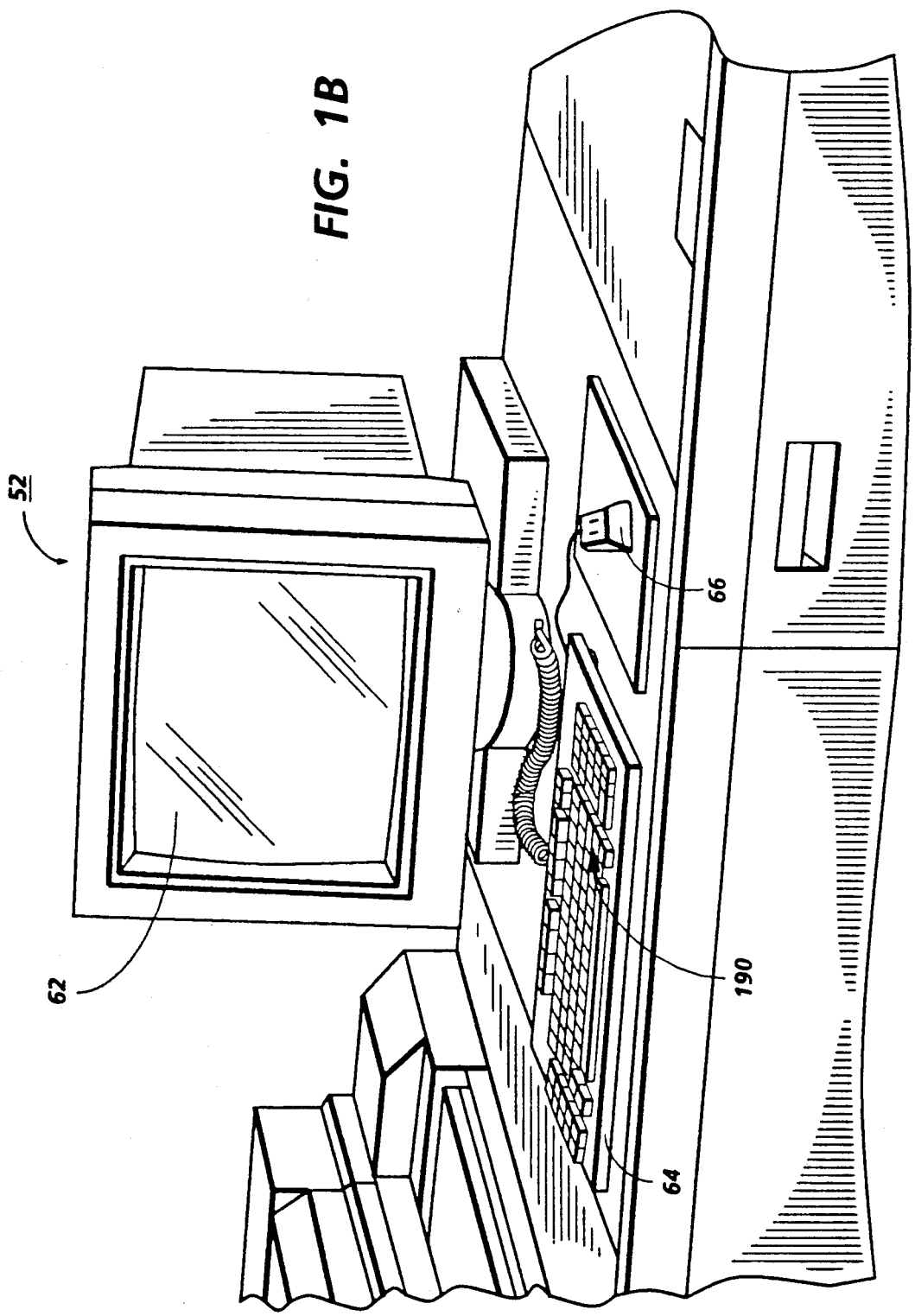

SYSTEM FOR PRINTING ORDERED STOCK

The invention relates to electronic printers and printing systems, and more particularly, to a system for printing ordered stock such as precut tabs.

Future electronic printers and printing systems are intended to provide the operator or user with as many job programming options and selections as reasonably possible. One very significant programming option is choice of stock, i.e. the print media on which the prints are made. One desirable stock type is ordered stock such as precut tabs, a series of different color sheets, etc. However, when using ordered stock, care must be taken to assure that the correct image is printed on the correct stock throughout the print process. For example, when using precut tabs, one must be sure that the image being printed matches up with the correct tab and that this remains so during the entire printing process. Otherwise, should there be for some reason a mismatch during the printing process, not only will the affected image end up printed on the wrong tab, but the entire sequence of images printed thereafter will be disrupted with the remaining images on the wrong tabs.

In the prior art, U.S. Pat. No. 4,521,102 to Motomura et al discloses a system for counting paper in a copying apparatus in which the number of copies are entered using a keyboard to program a counter, the counter being decremented with each copy made so there is provided a running count that can be used to identify the number of copies to be replaced in the event of a fault. U.S. Pat. No. 4,607,572 to Pou et al discloses a system for printing tags, with a jam detector to detect jams and record any tags lost as a result of a jam. U.S. Pat. No. 4,568,172 to Acquaviva discloses a document set recirculating method for small numbers of documents with separation between sets automatically controlled in response to the number of document sheets in the sets. U.S. Pat. No. 4,774,544 to Tsuchiya et al discloses a counter for an image forming apparatus for counting and managing data forming operations in which an EEPROM is used as a data store when power is interrupted. And U.S. Pat. No. 3,886,329 to Kamiyama discloses a counter apparatus, preset with the number of sheets to be copied, that generates a control signal when the number of copies made is equal to the preset number of sheets to be copied.

In contrast to the prior art, the present invention provides a process for operating a printing system having a source of electronic pages for use in producing prints, a printer for making prints from the electronic pages, and a controller section for controlling operation of the system to make prints in response to print programming instructions, comprising the steps of: programming the system to produce a predetermined number of prints on a sheet stock with the prints collated into groups; selecting an ordered stock comprising successive sets of sheets with each sheet in each of the sets being unique and arranged in a predetermined order; determining the number of different sheets of stock per group from the number of the electronic pages in the job and the number of prints to be made; programming a sequence number representing the number of the unique sheets in a set; from the sequence number and the number of sheets per group, identifying the number of sheets in the last set in each group printed that must be purged in order to remove excess sheets and maintain correspondence between the electronic images and the sheets; and at the end of printing of each group, purging the excess sheets from the last set for the group.

IN THE DRAWINGS:

FIGS. 1A and 1B comprise a view depicting an electronic printing system for printing from ordered stock of the present invention;

Figure 1A:
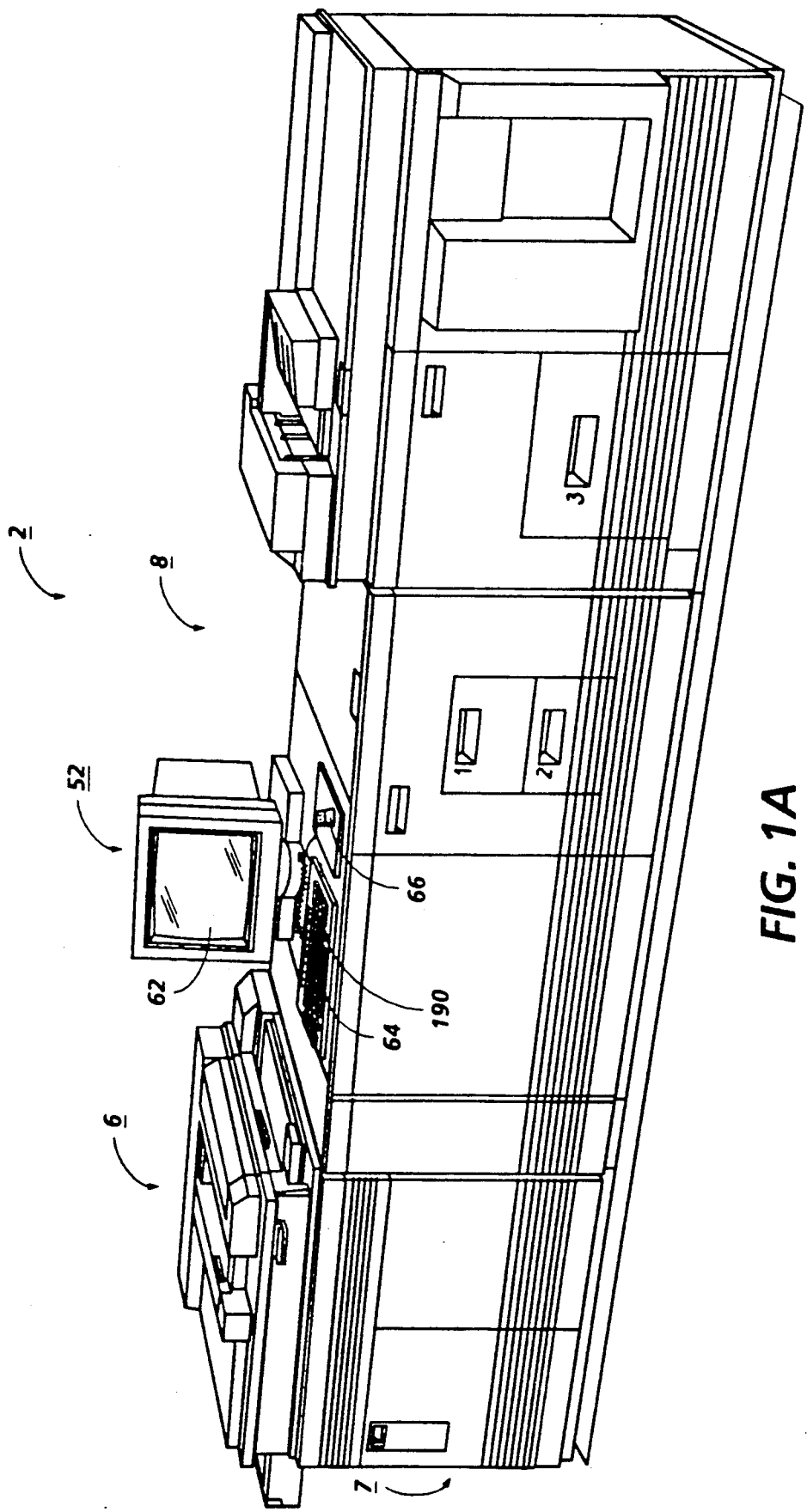
Figure 5A:
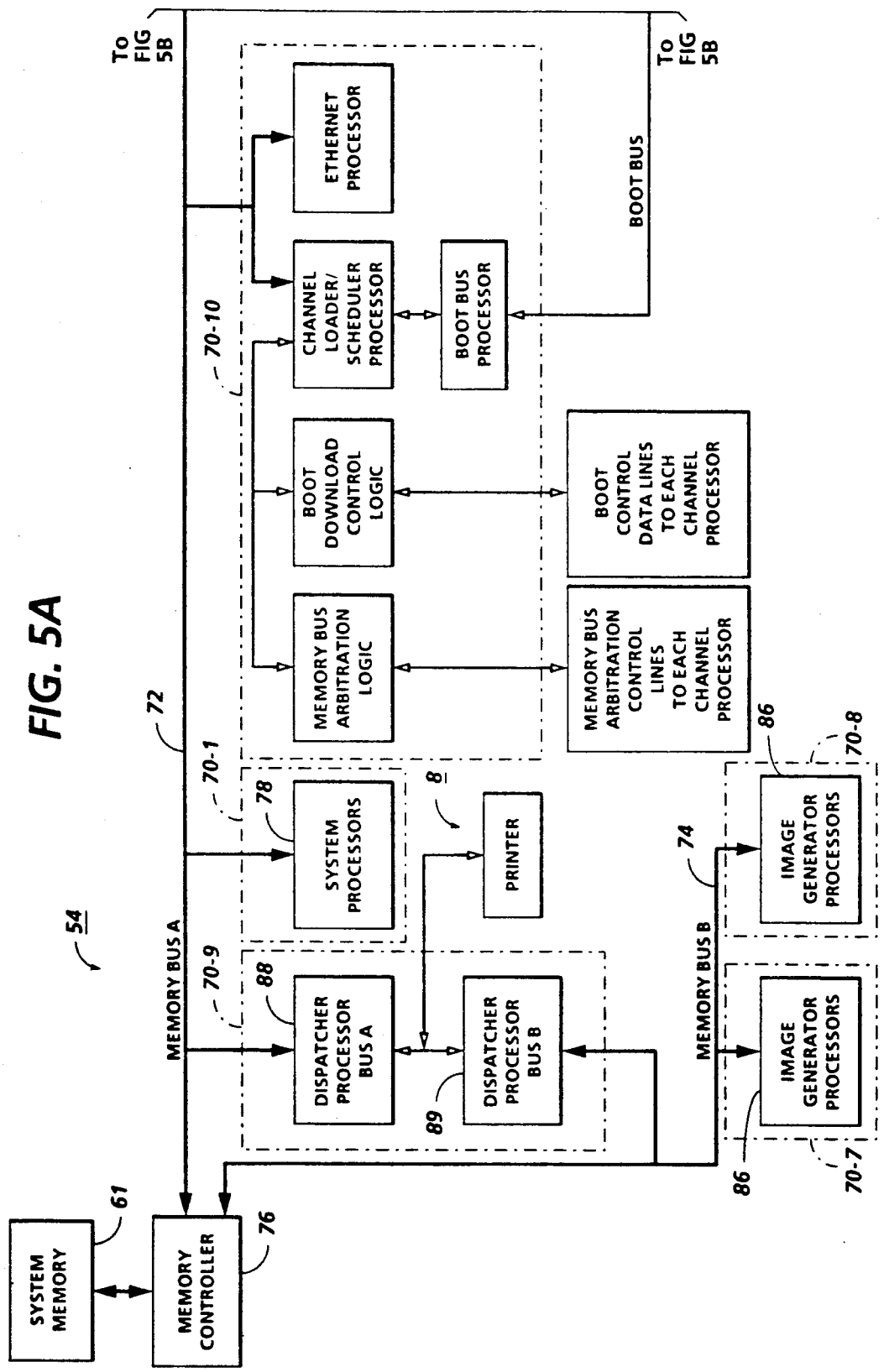
Figure 5B:
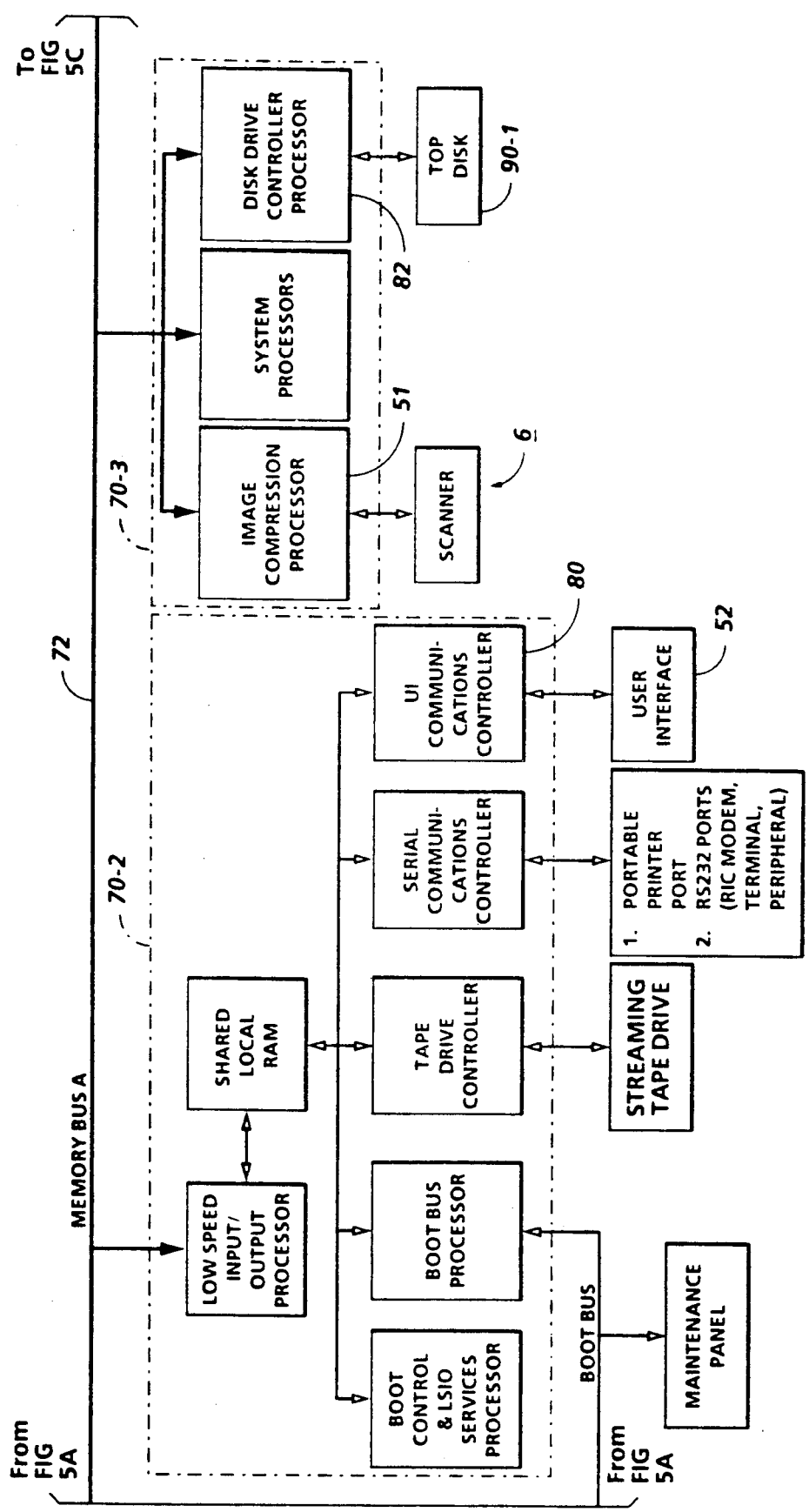
Figure 5C:
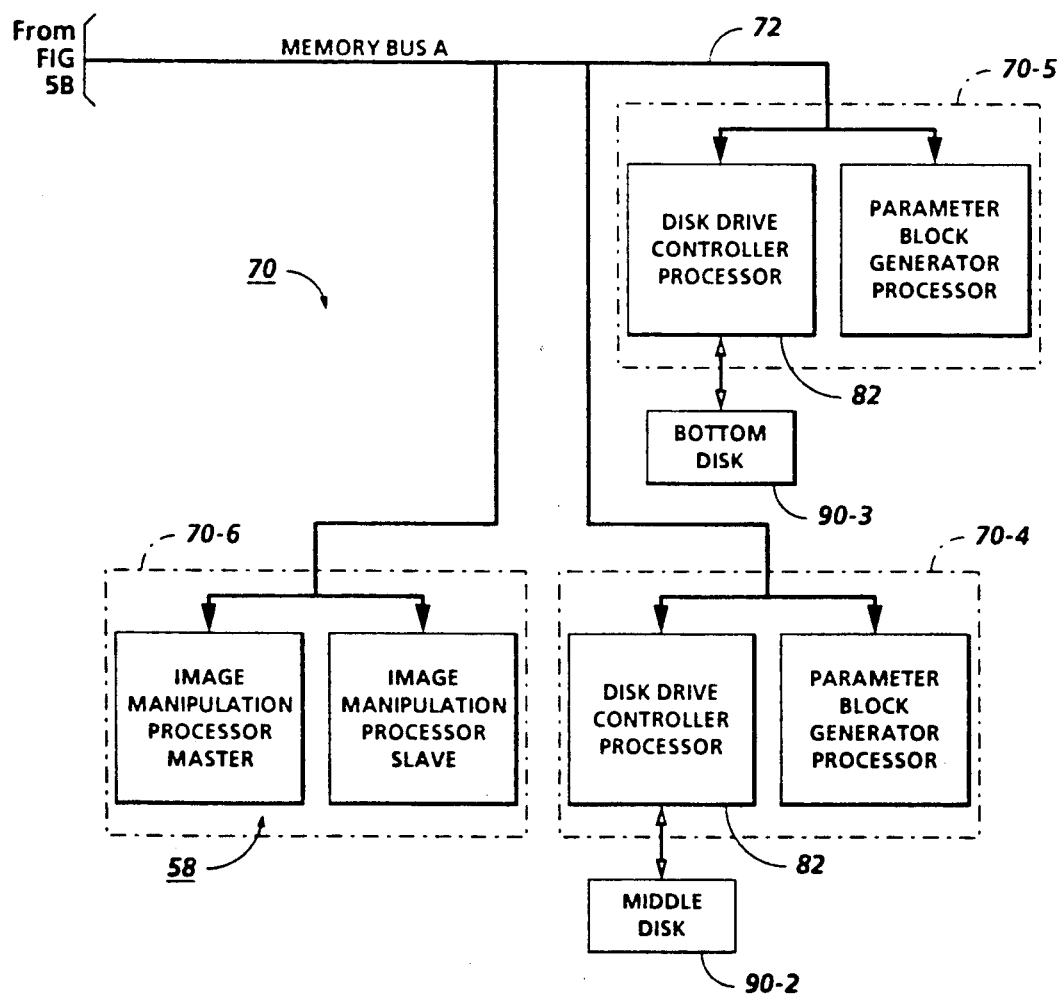
Figure 6:
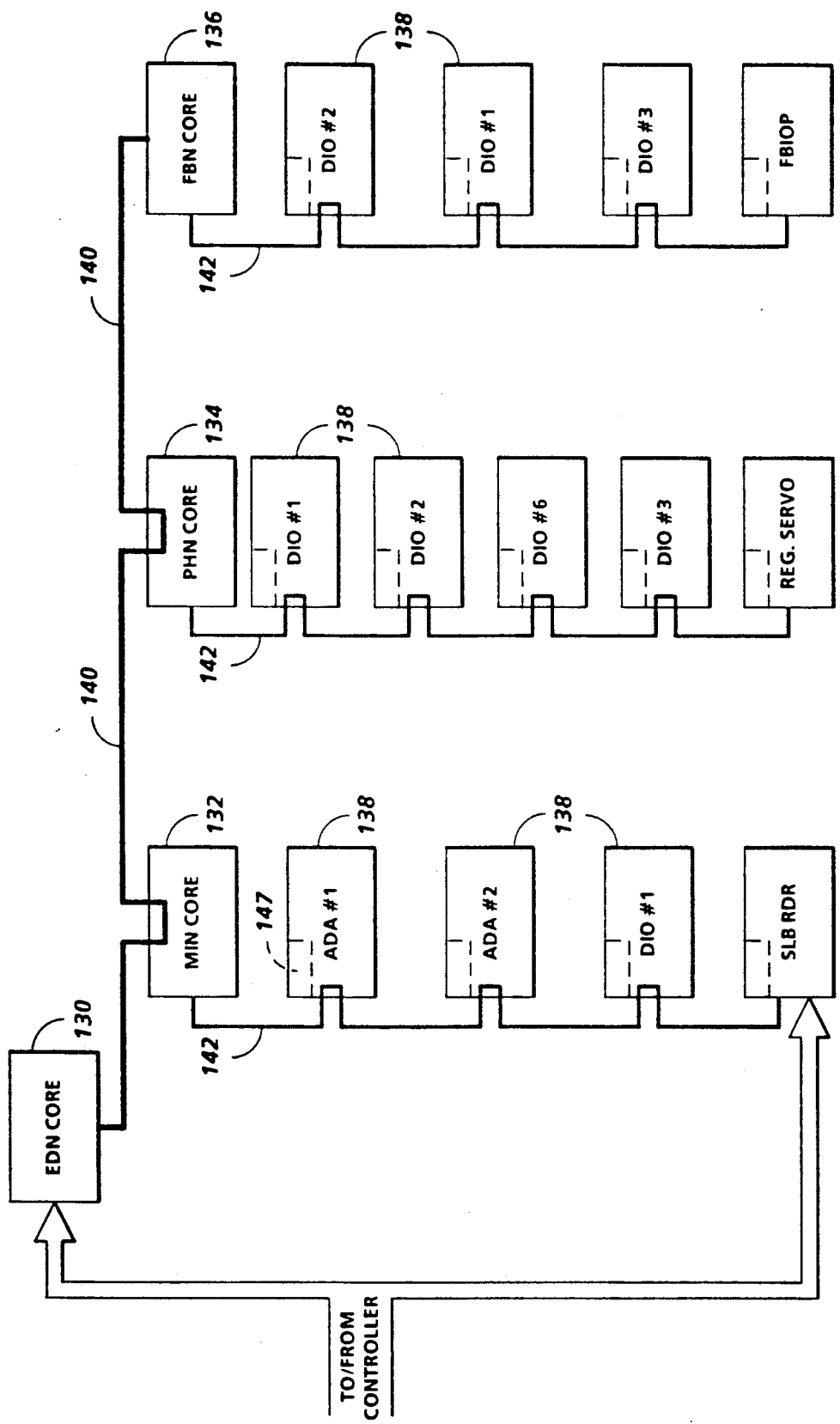
Figure 7:
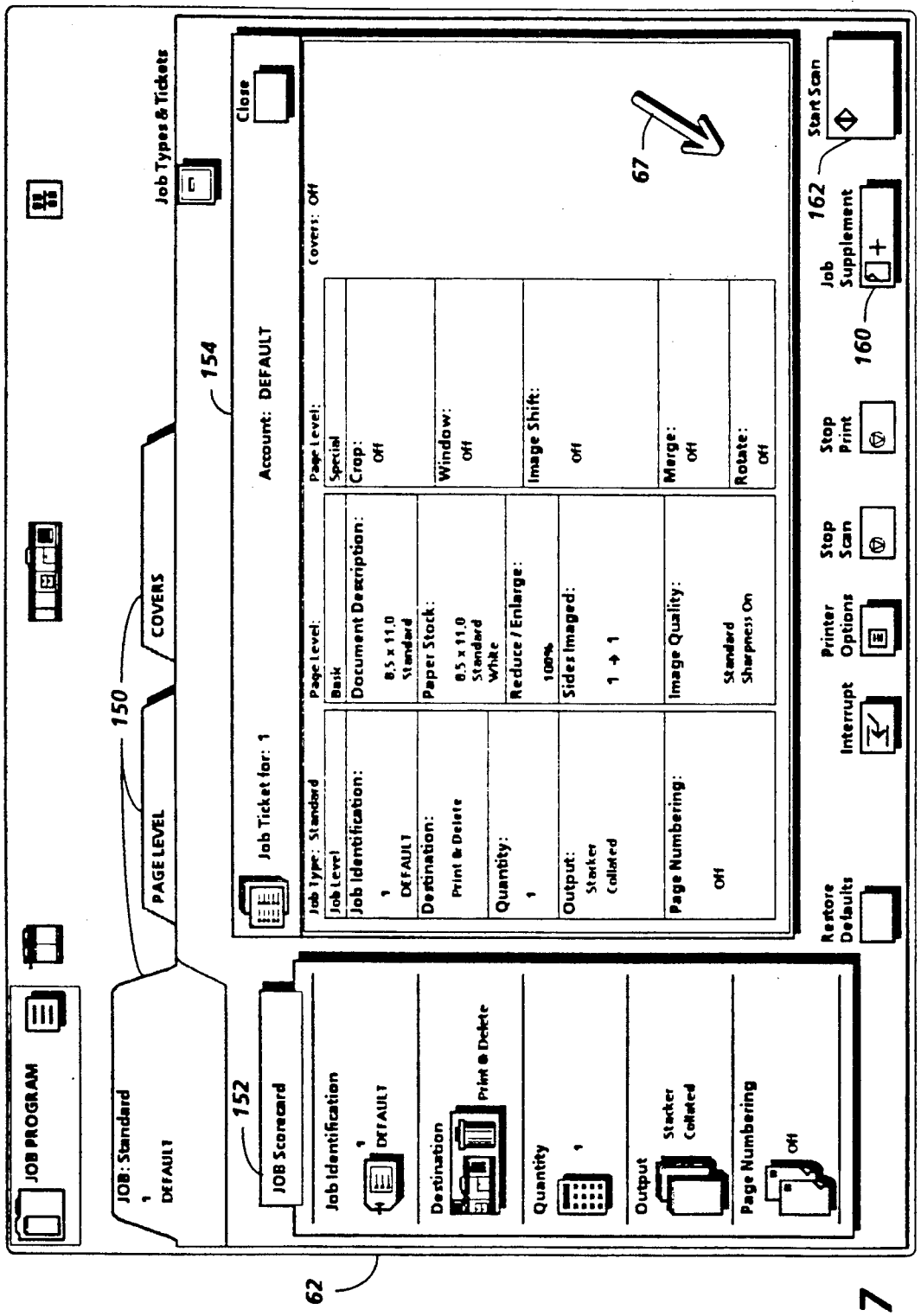
Figure 8:
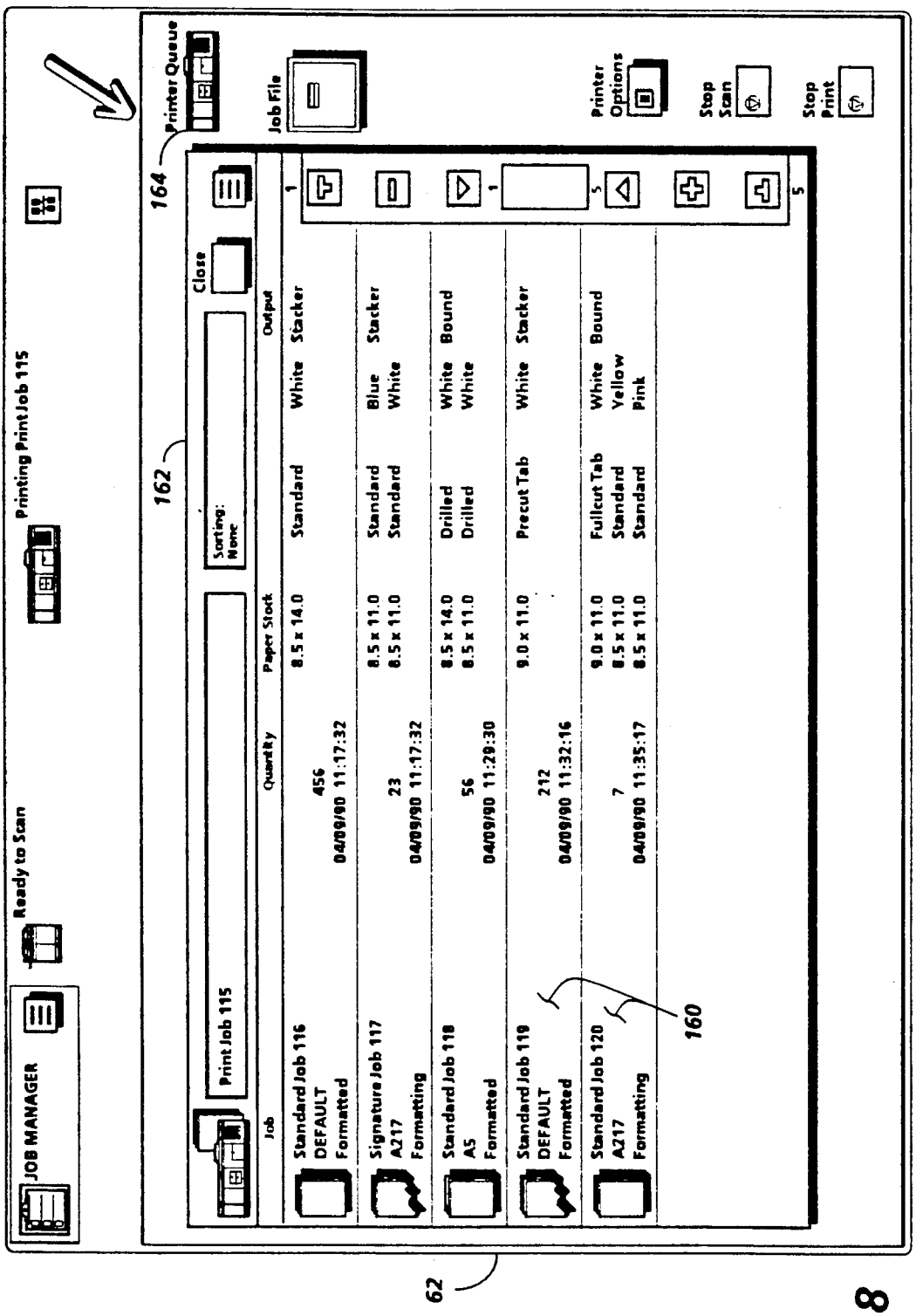
Figure 9:
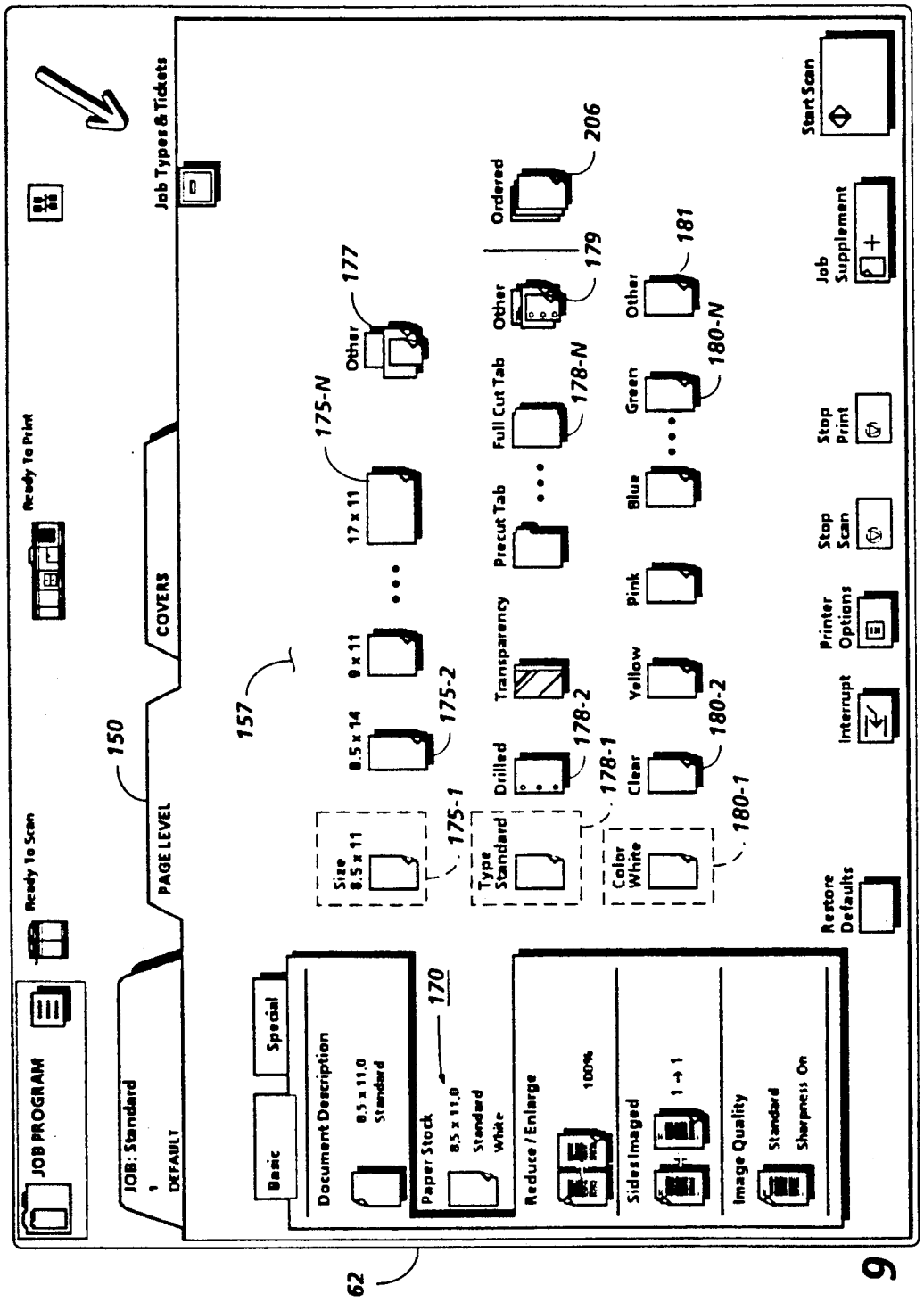
Figure 10:
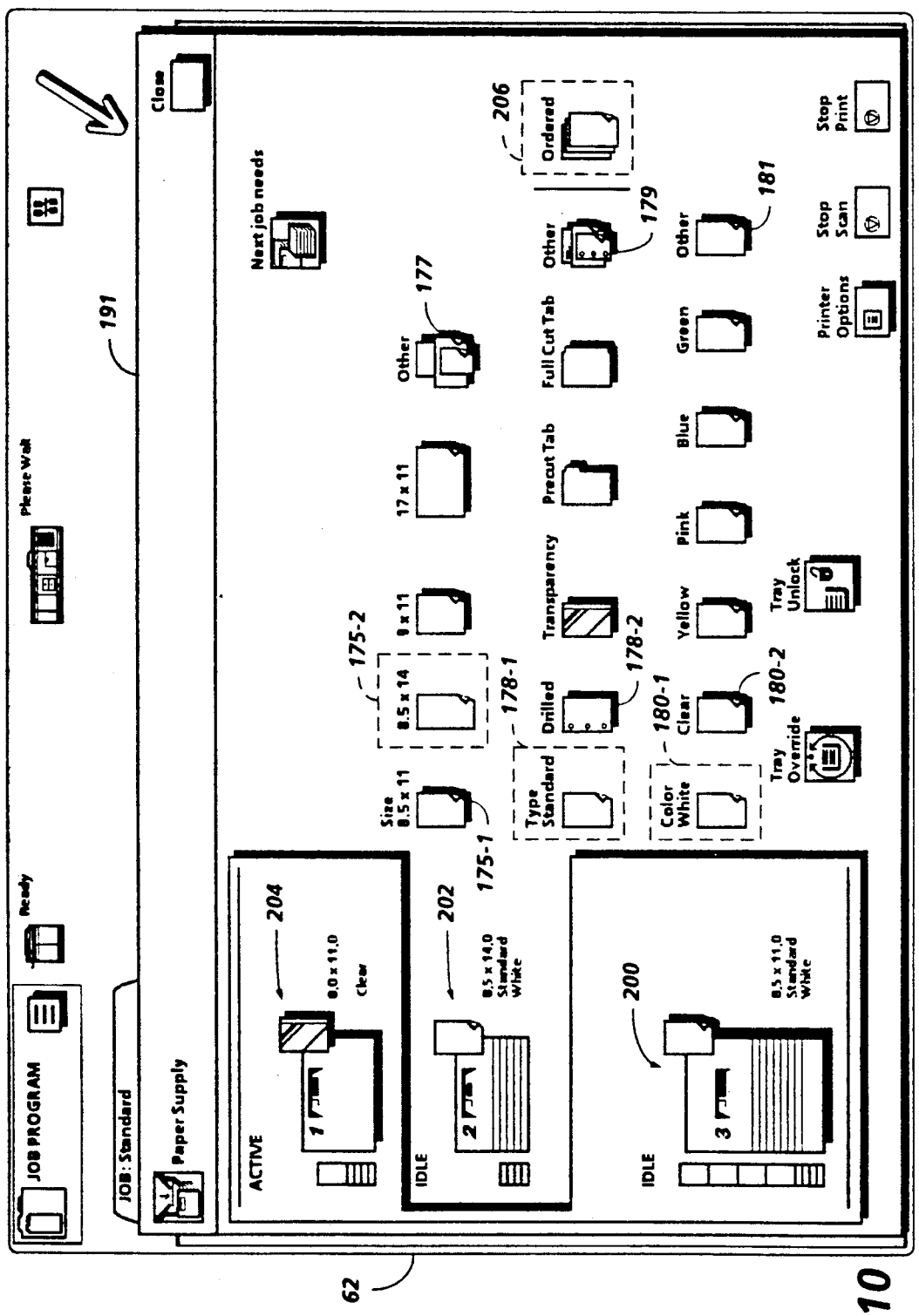
Figure 11:
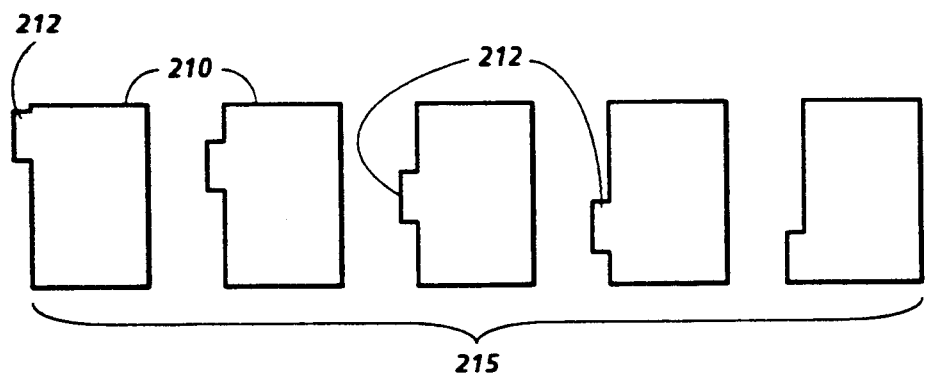
Figure 12:
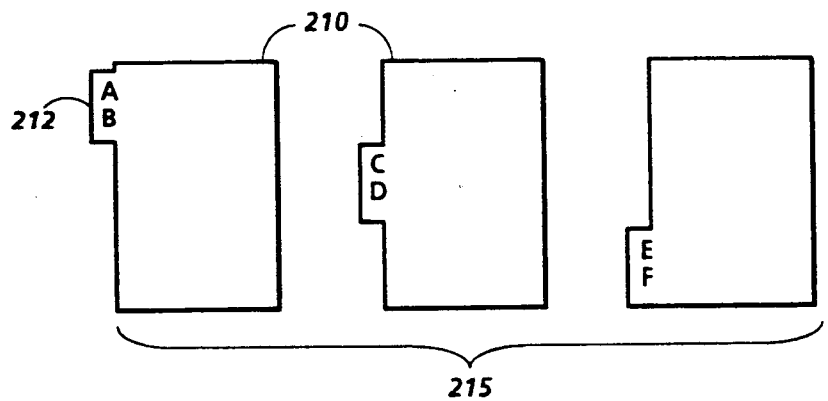
Figure 13:
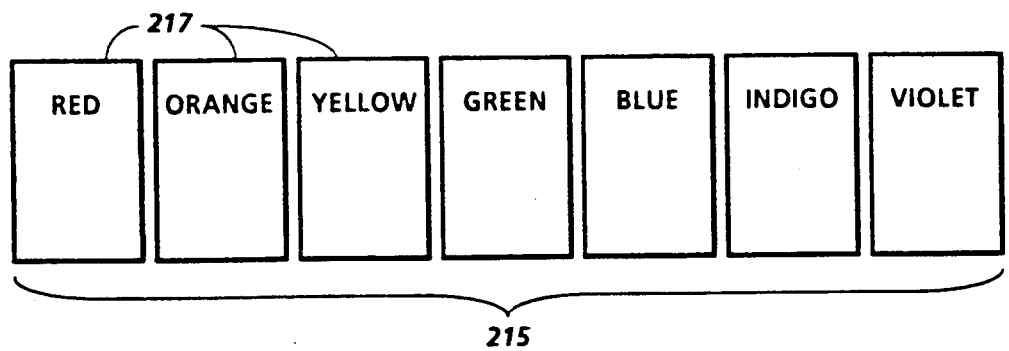
Figure 14:
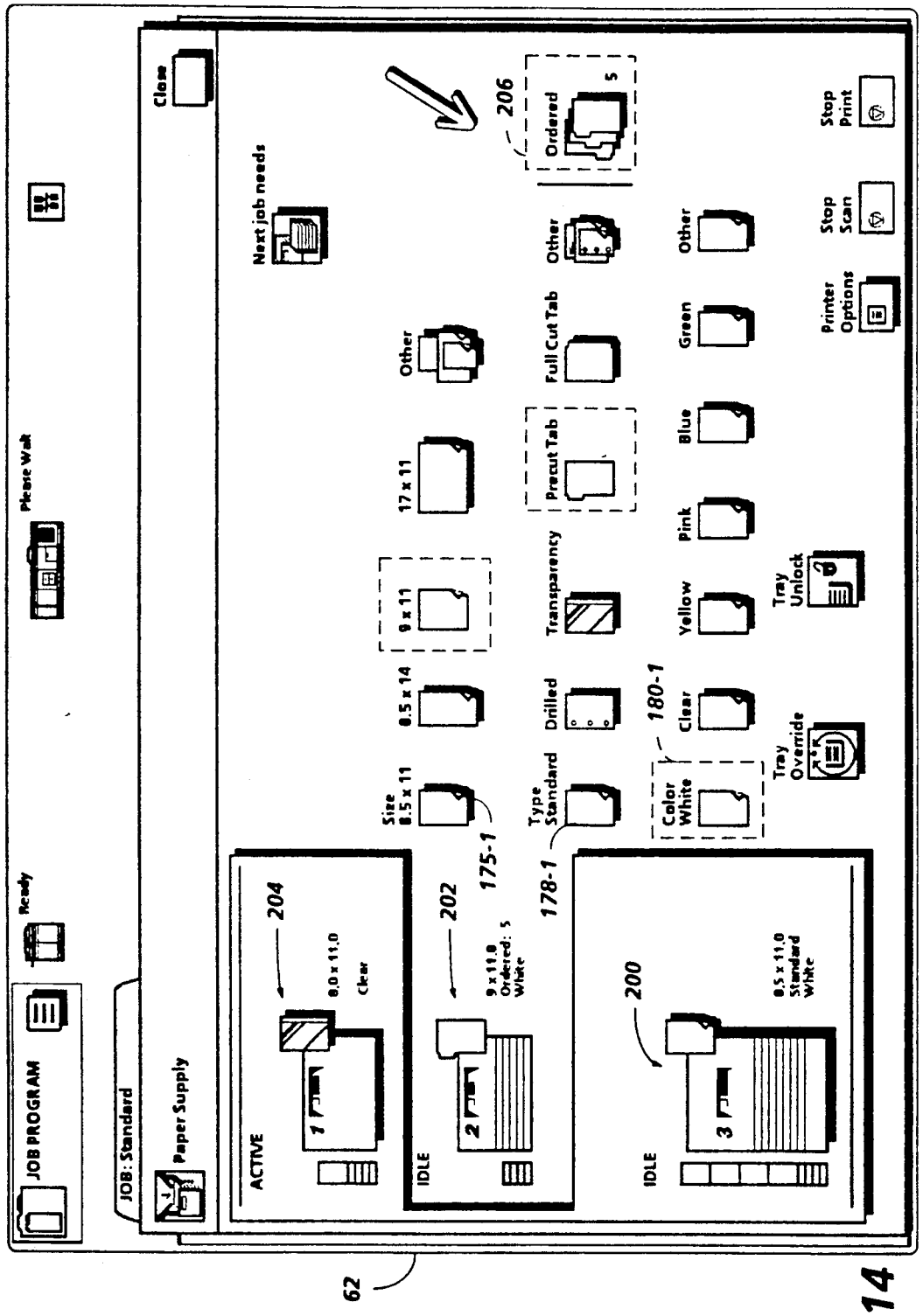
Figure 15:
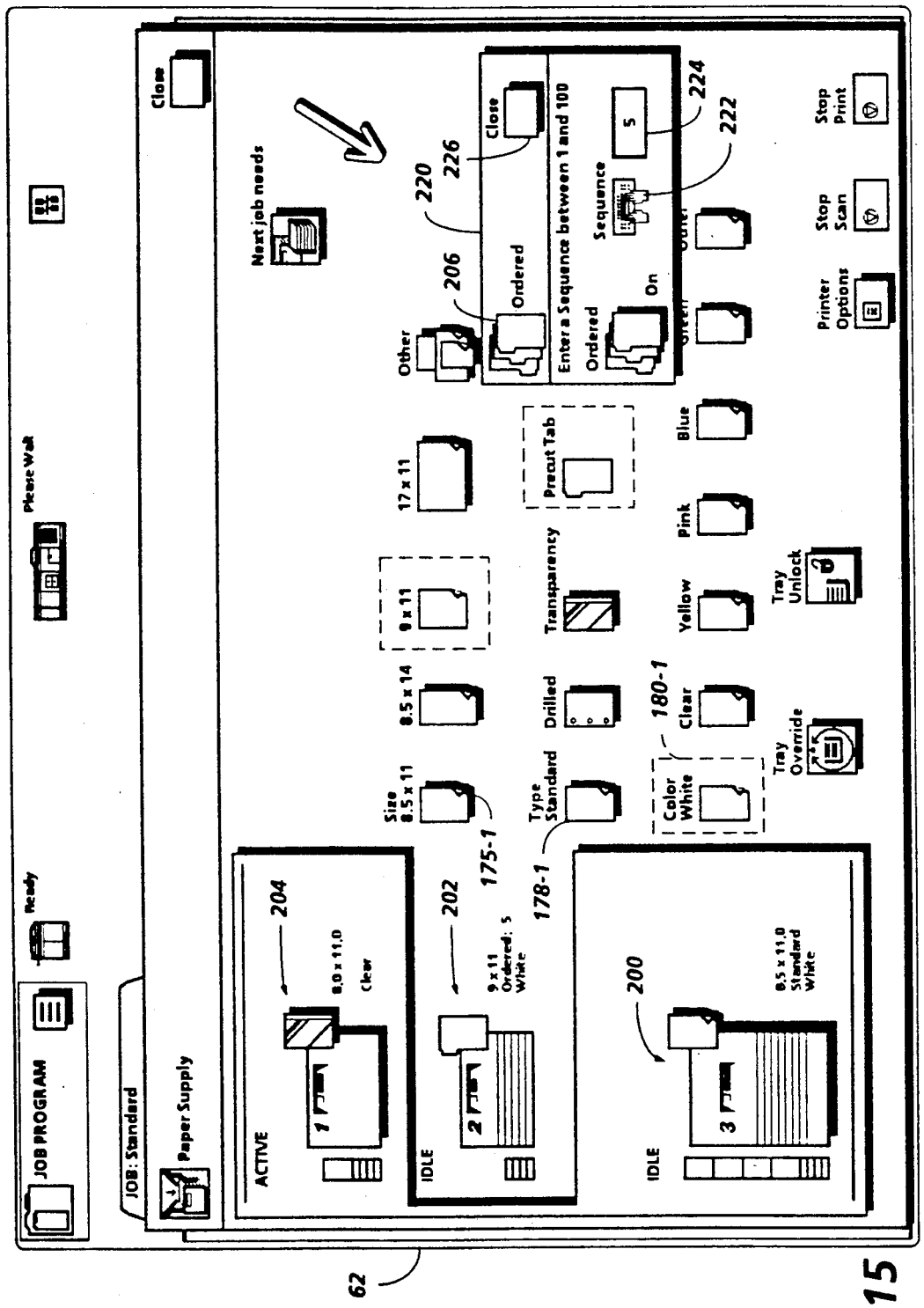
Figure 16:
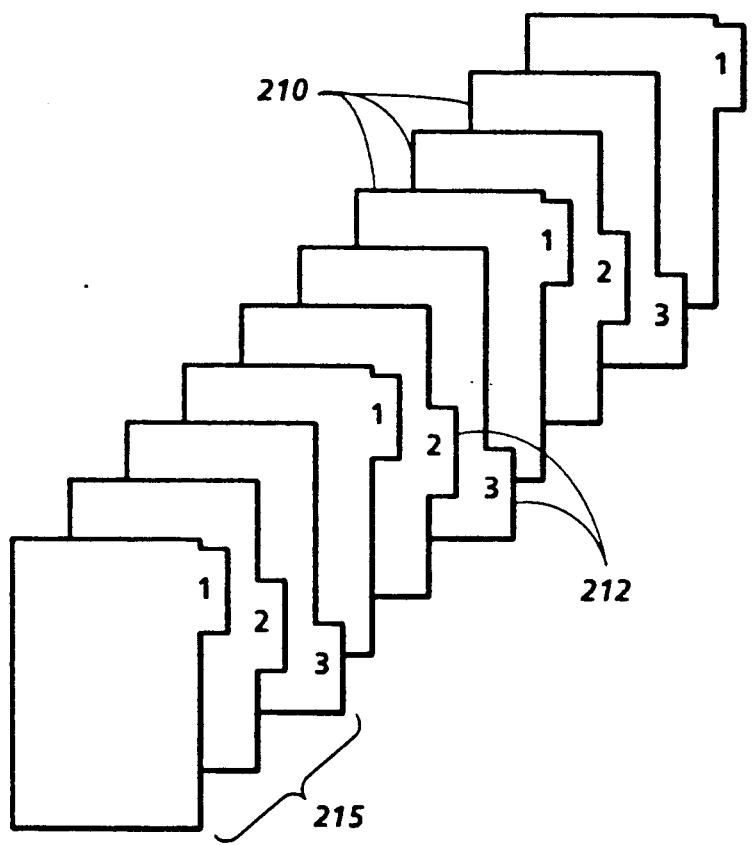
Figure 17:
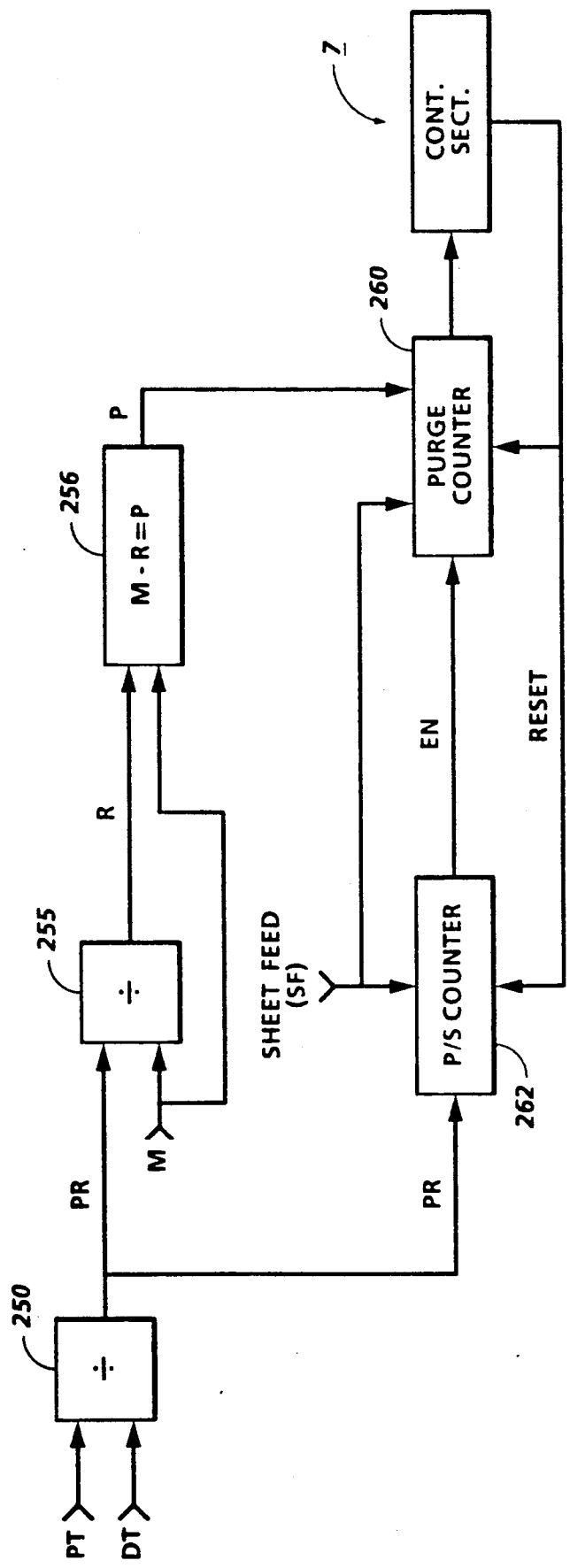
Figure 18:
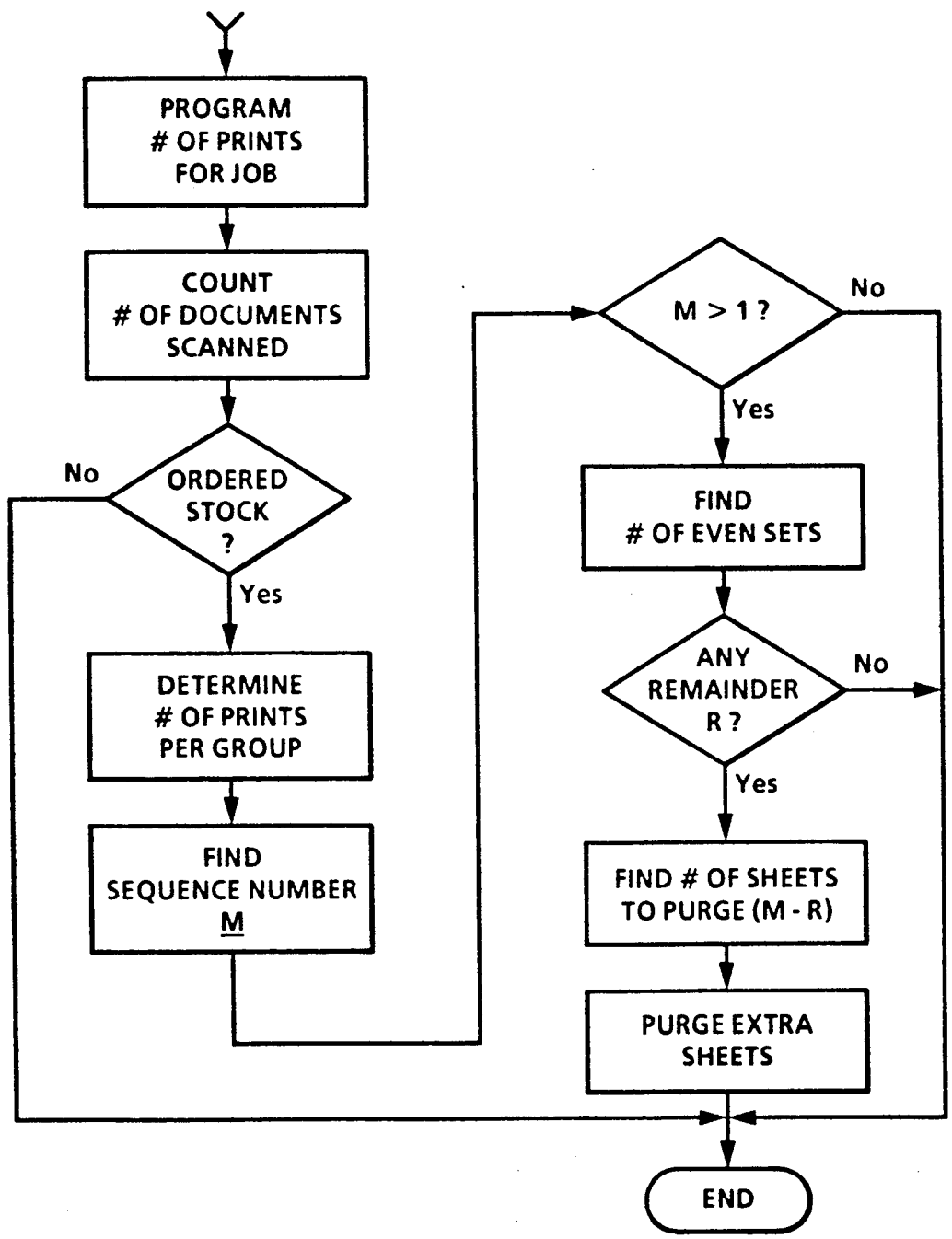

FIGS. 5A, 5B, and 5C comprise a schematic block diagram showing the major parts of the control section for the printing system shown in FIG. 1;

FIG. 6 is a block diagram of the Operating System, together with Printed Wiring Boards and shared line connections for the printing system shown in FIG. 1;

FIG. 7 is a view depicting an exemplary job programming ticket and job scorecard displayed on the User Interface (UI) touchscreen of the printing system shown in FIG. 1;

FIG. 8 is a view depicting an example of a print queue of jobs to be printed on the UI touchscreen;

FIG. 9 is a view depicting an example of a job scorecard with the Paper Stock icon opened to display various Paper Stock selections available for programming;

FIG. 10 is a view of the paper supply display showing various print media stock programming selections;

FIG. 11 is an plane view showing a 5 tab example of precut tab stock;

FIG. 12 is an isometric plane view showing a 3 tab example of preprinted tab stock;

FIG. 13 is an plane view of an example of ordered print media stock;

FIG. 14 is a view of the paper supply programming selections displayed following actuation of the "Precut Tab" stock icon;

FIG. 15 is a view showing the window display for changing the sequence number when programming "Ordered" stock;

FIG. 16 is an isometric view of an exemplary print job in which the number of tabs in each set is not an exact multiple of the number of tab positions used;

FIG. 17 is a block diagram of the control schematic for determining the number of ordered stock to be purged; and FIG. 18 is a flow chart showing the steps in the ordered stock printing process of the present invention.

Figure 2:
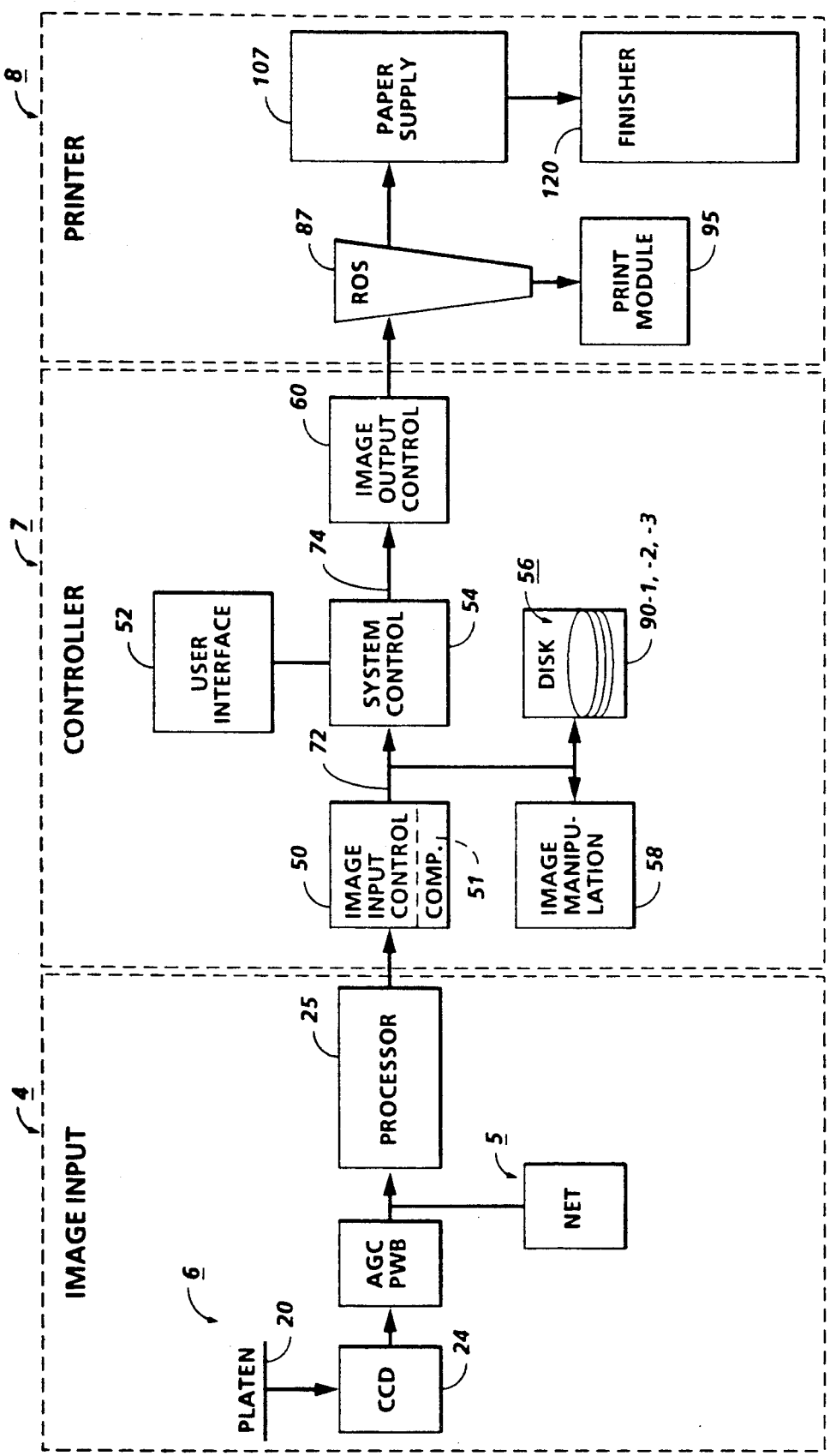
FIG. 2 is a block diagram depicting the major elements of the printing system shown in FIG. 1.

Referring to FIGS. 1 and 2, there is shown an exemplary image printing system 2 for processing print jobs in accordance with the teachings of the present invention. Printing system 2 for purposes of explanation is divided into image input section 4, controller section 7, and printer section 8. In the example shown, image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc. While a specific printing system is shown and described, the present invention may be used with other types of printing systems. For example, printer section 8 may instead use a different printer type such as ink jet, ionographic, etc.

Figure 3:
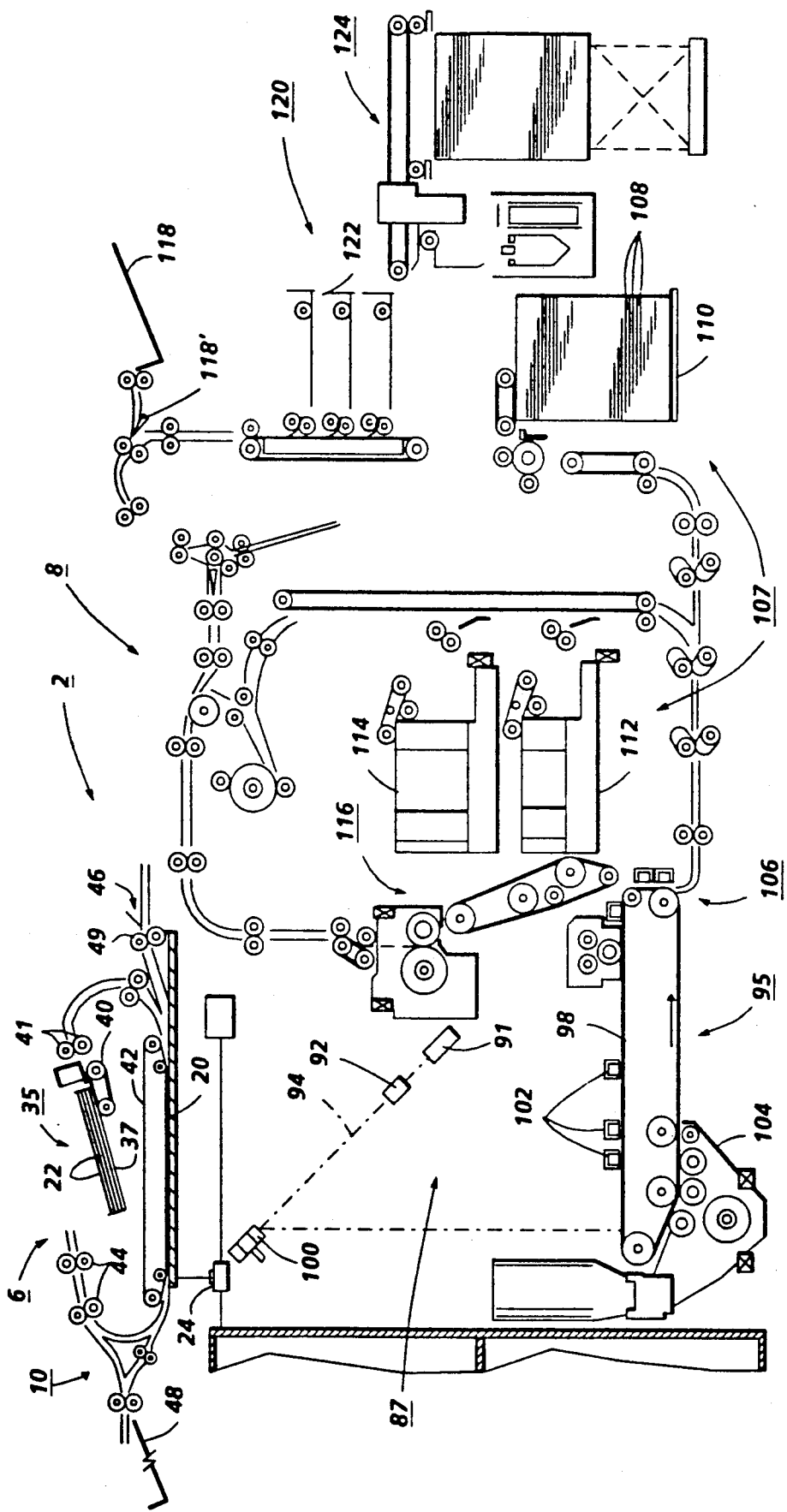
FIG. 3 is a plan view illustrating the principal mechanical components of the printing system shown in FIG. 1.
Figure 4:
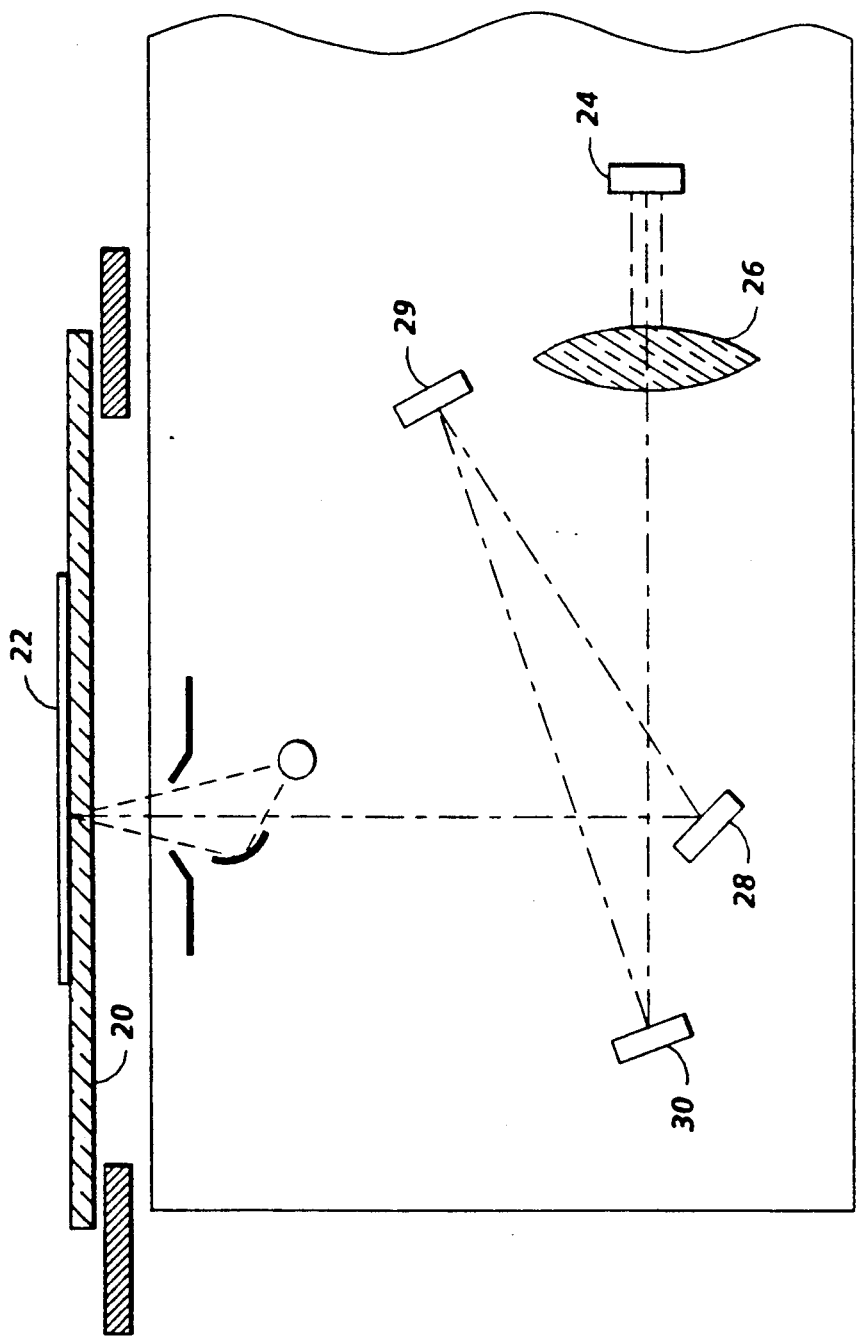
FIG. 4 is a schematic view showing certain construction details of the document scanner for the printing system shown in FIG. 1.

Referring particularly to FIGS. 2-4, for off-site image input, image input section 4 has a network 5 with a suitable communication channel such as a telephone line enabling image data in the form of image signals or pixels from one or more remote sources to be input to system 2 for processing. Where the Page Description Language (PDL) of the incoming imaging data is different than the PDL used by system 2, suitable conversion means (not shown) are provided. Other remote sources of image data such as streaming tape, floppy disk, etc. may be envisioned.

For on-site image input, section 4 has a document scanner 6 with a transparent platen 20 on which documents 22 to be scanned are located. One or more linear arrays 24 are supported for reciprocating scanning movement below platen 20. Lens 27 and mirrors 28, 29, 30 cooperate to focus array 24 on a line like segment of platen 20 and the document being scanned thereon. Image data in the form of image signals or pixels from net 5 or array 24 are input to processor 25 for processing. After processing, the image signals are output to controller section 7.

Processor 25 converts the analog image signals output by array 24 to digital. Processor 25 further processes image signals as required to enable system 2 to store and handle the image data in the form required to carry out the job programmed. Processor 25 also provides enhancements and changes to the image signals such as filtering, thresholding, screening, cropping, scaling, etc.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 95 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 1, 2 and 5, controller section 7 is, for explanation purposes, divided into an image input controller 50, User Interface (UI) 52, system controller 54, main memory 56, image manipulation section 58, and image output controller 60.

The image data input from processor 25 of image input section 4 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen best in FIG. 1B, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 (seen in FIG. 7) to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Referring particularly to FIGS. 5A-5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring particularly to FIG. 6, system control signals are distributed via a plurality of printed wiring boards (PWBs). These include EDN core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Referring to FIG. 7, jobs are programmed in a "JOB PROGRAM" mode using touchscreen 62 and/or mouse 66. For this, there is displayed a selection of programming file cards 150 (i.e., "JOB:Standard", "PAGE LEVEL", etc). Each file card 150, when selected, displays one or more Job Scorecards 152 containing the various job programming selections available with the selected Scorecard, and a Job Ticket 154 for the job. The Scorecard selections are in the form of windows with icons while the Job Ticket 154 displays three scorecard selections (i.e., "Job Level", "Basic", and "Special"). The Job Ticket also displays the selections made to the operator. Where no selection is made, the default selection is automatically programmed and displayed on the Job Ticket. In the example shown in FIG. 7, the default selections are shown, i.e., the "JOB-Standard" file card 150, the Job Scorecard 152 for "Job Level", and Job Ticket 154 for "Account: DEFAULT".

Referring also to FIG. 8, when a job 160 is printed, the job is moved from main memory 56 into a print queue 162. A PRINTER QUEUE icon 164 on touchscreen 62, when actuated, displays the current print queue with a list of the jobs in the queue on touchscreen 62. Each job 160 in print queue 162 has a job descriptor identifying the job by name and job number; the media size, type, and color; and type of finishing. Print queue 162 is ordered by priority and time of arrival of the job in the print queue.

Referring to FIGS. 7 and 9, one of the selections provided by the "Basic" Scorecard when programming a job is to choose the print stock on which prints will be made. For this, a PAPER STOCK selection 170 is displayed which when actuated displays three levels of stock selections, i.e., "Size", "Type", and "Color" on touchscreen 62 in the work area 157 adjacent the Scorecard. At the "Size" selection level, a series of icons 175-1, 175-2, . . . 175-n are displayed depicting various preset sheet size selections such as "8.5×11", with "other" icon 177 for custom selections. At the "Type" selection level, a series of icons 178-1, 178-2, . . . 178-n are displayed, depicting the various types of stock that are available for selection as for example "Precut Tab", with "other" icon 179 for custom selections and "ordered" icon 206 for ordered stock. At the "Color" selection level, icons 180-1, 180-2, . . . 180-n depict various stock color selections, with an "other" icon 181 for custom selections.

Following completion of the programming selections, the PAPER STOCK selection 170 is closed to load the selections (along with the other selections made) into main memory 56 pending use.

Subsequently, the stock selections programmed (except in cases where the stock is currently loaded) must be loaded into one or more of the paper trays 110, 112, 114. To do this, the tray or trays are opened and the selected stock loaded in.

Referring to FIGS. 1B and 10, in order to identify the specific stock currently loaded in each of the paper trays 110, 112, 114, a "Paper Supply" button 190 on keyboard 64 is actuated to display on touchscreen 62 a "Paper Supply" file card 191 having icons 200, 202, 204 representative of trays 110, 112, 114 respectively.

Where a paper stock is changed in one of the paper trays, the icon 200, 202, 204 for the paper tray is actuated. This results in a three level "Size", "Type", and "Color" display of stock selection icons shown in FIG. 9 in the workarea 157 adjacent the opened tray icon 200, 202, or 204.

Where the print media stock is "Ordered" as in the case of "Precut Tab" for example, additional programming information is necessary in order to insure that the images printed are matched with the correct sheet of stock. This additional programming information, referred to herein as the sequence or modulus number, is required to avoid conflicts and inadvertent operator programming errors, to allow printing system 2 to automatically purge excess sheets, and to enable automatic job recovery in the event of a fault such as a paper jam.

Typically, the sequence number is required when either tabbed or ordered stock is selected.

Referring now to FIG. 11, tabbed stock (i.e. "Precut Tab") comprises a sheet 210 of print media stock having a tab 212 projecting from one side. As will be understood, tabbed sheets 210 are typically used to facilitate access to specific pages or areas in a bound document or book. Tabs 212 may be clear, that is, without printing as shown in FIG. 11 or may have information or data preprinted thereon as in the preprinted tabs shown in FIG. 12.

The location of tabs 212 along the sides of the tabbed sheet 210 are normally offset from one another to prevent one tab from blocking viewing of the other tabs. The number of tab offset positions determines the number of tabbed sheets 210 in a series or set 215. In the example shown in FIG. 11, a set 215 composed of 5 tabbed sheets is shown. In the example shown in FIG. 12, a set 215 composed of 3 tabbed sheets 215 of preprinted tabs 212 is shown.

Ordered stock may comprise any set of successively different or unique sheets of print media that forms a repetitive pattern or set 215. In the example shown in FIG. 13, a 'rainbow' set of stock is shown where the stock 217 consists of 7 different colors, i.e., red orange, yellow, green, blue, indigo, and violet.

The sequence number is essentially a number identifying the number of sheets of stock in a set 215. In the case of "Precut Tab", where the tabbed stock is not preprinted, the sequence number is equal to the number of different tab positions in each set 215. In the example shown in FIG. 11, the sequence number is 5. Where the tabbed stock is preprinted or the stock is ordered, the sequence number is equal to the number of tabs 212 or different sheets per set 215. In the examples shown in FIGS. 12, 13, the sequence number is 3 for the preprinted tabbed stock 210 and 7 for the ordered stock 217.

Referring now to FIGS. 14 and 15, where "Precut Tab" stock is selected, the current settings are pictured. In the example shown, these comprise a "Size" setting of "9×11" and a "Color" setting of "White". A default sequence number of 5 is also displayed indicating that the number of different tab positions in each set 210 is five. "Ordered" icon 206 is also highlighted.

Where the operator uses a tabbed stock having a different number of tabs 210 than that represented by the default setting, "Ordered" icon 206 is actuated to display a sequence change window 220. Window 220 incorporates a keyboard icon 222 representative of keyboard 64 of UI 52 and a numeral display window 224 which displays the current sequence setting. Using keyboard 62, the operator enters the new sequence number and actuates "Close" icon 226 to program the change.

Similarly, where the operator loads ordered stock having a sequence different than the current sequence setting, "Ordered" icon 206 is actuated to enable keyboard 64 as described. Using keyboard 62, the operator enters the correct sequence number.

Referring to FIG. 16, where a print job is programmed in which the number of tabs in each print group is not an exact multiple of the number of tab positions being used, the extra or additional tabs must be purged if synchronization between the prints and the tabbed stock is to be maintained. In the example shown in FIG. 16, the number of tabs per output group is 10 while the number of tab positions is 3. The sequence number is 3 which when divided into 10 shown that 3 sets of prints on tabbed stock together with a single print will result. It can be seen therefore that there will be 2 unused tabbed sheets at the end which unless purged from the system, will erroneously receive the first two images from the next group of prints. Similarly, should a paper jam occur during the printing cycle, not only must the prints lost be reprinted but also the tabbed sheet or sheets associated with the replaced prints be in effect re-ordered to assure that the make up print or prints are printed on the correct tabbed sheet. Using the sequence number, the system can identify the tabbed sheets to be purged in cases such as these.

Referring particularly to FIGS. 17 and 18, the total number of prints programmed (PT) and the document total scanned by scanner section 6 (DT) are input to a suitable divider 250 to determine the number of prints (PR) in each group. The number of prints PR in each group and the sequence number M are input to divider 255 to find the number of sets. Where PR and M are not evenly divisible, a remainder (R) is obtained, and R is subtracted from M by subtractor 256 to provide a purge number (P) reflecting the number of tabbed sheets to be purged from each set when printing. The purge number (P) is used to set purge counter 260 which when enabled is decremented by a sheet feed signal (SF) that is generated each time a tabbed sheet is fed by Paper Supply 107 (shown in FIG. 2). A print-set counter 262 is set by the signal from divider 250. Counter 262 is also clocked by sheet fed signal (SF).

When enabled, the purge signal (P) output of counter 260 is used by controller section 7 to inhibit printing of an image on the tabbed sheet or sheets of stock fed by Paper Supply 107. At the same time, gate 118' (shown in FIG. 3) is actuated to route the unprinted sheet or sheets to tray 118. Following decrementing of counter 260 to zero, counters 260, 262 are reset for the next set to resume printing of the next group of prints while gate 118' is reset to route the finished prints to printer 120.

When a jam occurs in the paper path when printing tabbed sheets, the purge number (P) is used as an input in determining the number of tabbed sheets to be refed to make up for the tabbed sheets lost or destroyed due to the jam.

It is understood that the control functions shown and described in connection with FIG. 17 may be carried out in whole or in part by software.

While the foregoing explanation has referred to tabbed sheet stock, processing of ordered sheet stock of any kind such as pre-printed tabbed stock (shown in FIG. 12), rainbow stock (shown in FIG. 13), etc. may be similarly envisioned.

While the invention has been described with reference to the structure disclosed, it is not confined to the details set forth, but is intended to cover such modifications or changes as may come within the scope of the following claims.

We claim:

1. A process for operating a printing system to print a job, said job having a source of electronic pages for use in producing prints, said system including a printer for making prints from said electronic pages, and a controller section for controlling operation of said system to make prints in response to print programming instructions for said job, comprising the steps of:

a) programming said system for said job to produce a predetermined number of prints from said electronic pages on a sheet stock with said prints collated into groups;

b) selecting an ordered stock comprising successive sets of sheets with each sheet in each of said sets being unique and said unique sheets in each of said sets arranged in a predetermined order;

c) determining the number of different sheets of stock per group from the number of said electronic pages in said job and said predetermined number of prints to be made;

d) programming a sequence number representing the number of said unique sheets in a set;

e) from said sequence number and said number of different sheets per group, identifying the number of sheets in the last set in each group printed that must be purged in order to remove excess sheets and maintain correspondence between said electronic images and said sheets; and f) at the end of printing of each group, purging said excess sheets from the last set for said group.

2. The process according to claim 1 including the step of:

providing said ordered stock from tabbed stock with the number of tabs in each of said sets being represented by said sequence number.

3. The process according to claim 1 including the step of:

providing said ordered stock from stock consisting of different color sheets with the number of said different color sheets in each of said sets being represented by said sequence number.

4. The process according to claim 2 including the step of:

preprinting said tabs.

5. A process for operating a printing system to make prints on tabbed sheets, said printing system including print means for producing prints on sheets of stock such as said tabbed sheets, tray means for supplying sheets to said printer means, and control means for controlling operation of said printing system to make prints on said sheets in response to print programming instructions, comprising the steps of:

a) programming a print job by said system to produce groups of prints on said tabbed sheets from a preset number of electronic images with each of said groups having a selected number of prints in collated order;

b) loading plural sets of said tabbed sheets in said tray means with the tabbed sheets of each set having a different tab location:

c) loading said sets of said tabbed sheets in step b in reverse order;

d) inputting a sequence number equal to the number of different ones of said tabbed sheets in each set;

e) determining the number of prints in said groups of prints;

f) using said sequence number and said selected number of prints in each of said groups of prints, determining the number of said sets of said tabbed sheets required to produce said selected number of prints for each of said groups; and g) where the number of said tabbed sheets in said sets is greater than the number of prints in each of said groups so that there is an excess of said tabbed sheets, purging said excess of said tabbed sheets at the end of each of said groups of prints prior to printing of the next one of said groups of prints.

6. The process according to claim 5 in which said printing system includes paper path forming means for transporting sheets from said tray means to said printer means, including the steps of:

determining a purge number representative of the number of sheets to be purged in the event of a jam in said paper path means; and in response to a jam in said paper path means when making prints on said tabbed sheets, determining from said purge number the number of said tabbed sheets to be re-fed to replace the tabbed sheets purged.

7. A process for operating a printing system to make prints on sheets, comprising the steps of:

a) programming said printing system to make a predetermined number of prints from a preset number of electronic images;

b) providing plural sets of sheets for said prints, each successive sheet in each of said sets being unique;

c) from the number of said unique sheets in each set and said predetermined number of prints programmed, determining the number of sets of said prints to be made; and d) where the number of prints in each of said sets of prints is less than the number of said unique sheets in the set so that there are extra ones of said unique sheets, discarding said extra ones of said unique sheets.

8. The process according to claim 7 including the step of:

providing tabbed sheets for said sets of unique sheets, with each of said tabbed sheets in each of said sets of sheets having a tab offset from the tabs of the other ones of said tabbed sheets in each of said sets.

* * * * *